(12) United States Patent
Fuller

(10) Patent No.: US 10,551,220 B2
(45) Date of Patent: Feb. 4, 2020

(54) CAPACITIVE MEASUREMENT DEVICE

(71) Applicant: Rolls-Royce Corporation, Indianapolis, IN (US)

(72) Inventor: Kenneth Fuller, Camby, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 274 days.

(21) Appl. No.: 15/194,080

(22) Filed: Jun. 27, 2016

(65) Prior Publication Data

US 2017/0370748 A1    Dec. 28, 2017

(51) Int. Cl.
  *G01D 5/24*     (2006.01)
  *G01D 5/241*    (2006.01)
  *G01B 7/02*     (2006.01)

(52) U.S. Cl.
  CPC ........... *G01D 5/2417* (2013.01); *G01B 7/023* (2013.01)

(58) Field of Classification Search
  CPC .............................. G01D 5/2417; G01B 7/023
  USPC ........................................................ 324/662
  See application file for complete search history.

(56) References Cited

U.S. PATENT DOCUMENTS

| | | | |
|---|---|---|---|
| 4,329,644 A | 5/1982 | Libertini et al. | |
| 4,804,905 A | 2/1989 | Ding et al. | |
| 5,101,165 A | 3/1992 | Rickards | |
| 5,166,626 A * | 11/1992 | Hester | G01B 7/14 324/683 |
| 5,359,491 A * | 10/1994 | Coville | G01B 7/14 29/592.1 |
| 5,760,593 A | 6/1998 | Lawrence et al. | |
| 5,892,365 A * | 4/1999 | Bailleul | G01B 7/14 324/662 |
| 5,973,502 A * | 10/1999 | Bailleul | G01B 7/14 324/662 |
| 6,054,866 A | 4/2000 | Mansfield | |
| 6,575,011 B1 | 6/2003 | Busby et al. | |
| 6,692,222 B2 * | 2/2004 | Prinz | F01D 5/048 415/132 |
| 2009/0003991 A1 | 1/2009 | Andarawis et al. | |
| 2010/0242293 A1 | 9/2010 | Willett et al. | |
| 2010/0256926 A1 * | 10/2010 | Franklin | G01R 31/343 702/33 |
| 2011/0006791 A1 | 1/2011 | Schneider et al. | |
| 2013/0311130 A1 * | 11/2013 | Horton | F01D 17/02 702/142 |
| 2013/0321002 A1 | 12/2013 | Elliott | |
| 2014/0119884 A1 * | 5/2014 | Esler | G01B 7/14 415/13 |
| 2015/0097582 A1 * | 4/2015 | Szedlacsek | G01B 7/14 324/662 |

* cited by examiner

*Primary Examiner* — Jeff W Natalini
(74) *Attorney, Agent, or Firm* — Duane Morris LLP

(57) ABSTRACT

A capacitive measurement device for indicating when two surfaces moving relative to each other are spaced less than a predetermined distance apart. The device comprises a probe having an elongated conductor, an insulating core, a conducting inner guard, an insulating interlayer, and a conducting sheath. A portion of the conductor, insulating core and conducting inner guard form a probe tip which extends beyond the insulating interlayer and conducting sheath by a predetermined offset. The probe is configured to extend from a first surface by a predetermined distance and to generate a signal when the tip is contacted by a second surface.

17 Claims, 4 Drawing Sheets

CAPACITIVE MEASUREMENT DEVICE

This invention generally relates to methods and systems for measuring the clearance between two surfaces having relative motion between each other.

BACKGROUND

A critical step in the development of any machine with moving components is to validate the minimum clearance between these moving components during operation of the machine. This validation is typically accomplished by installing solid, metal rub pins which make physical contact with components during operation. After the machine is shut down, the rub pins are inspected and measured to determine the amount of wear to the pins. This inspection may require disassembly of the machine. The amount of wear on the rub pins indicates the minimum clearance that occurred at some point during the operation of the machine.

There remains a need for a device which can accurately indicate when a predetermined clearance between two surfaces is reached in real-time during the operation of a machine.

SUMMARY

As disclosed herein, devices and methods are described which indicate in real-time when a predetermined clearance between two surfaces is reached. The device may be a sensor or probe designed to contact a surface, or target, without causing damage to that surface. The device may be a subminiature capacitance sensor that produces a distinct voltage change when the sensor is physically contacted. The devices and methods disclosed herein minimize downtime by indicating in real-time when a predetermined clearance is achieved without disassembly of the machine, provide an output which can be recorded and processed, can validate traditional tip clearance measurement systems, are highly sensitive and accurate, and are cost effective to manufacture and easy to install.

In accordance with some embodiments of the present disclosure, a capacitive measurement device for indicating when two surfaces moving relative to each other are spaced less than a predetermined distance is provided. The device comprises at least one probe, the probe comprising an elongated conductor, an insulating core which radially encases at least a portion of the conductor, a conducting inner guard which radially encases at least a portion of the insulating core, an insulating interlayer which radially encases at least a portion of the inner guard, and a conducting sheath which radially encases at least a portion of the insulating interlayer. A portion of the conductor, insulating core, and conducting inner guard form a probe tip. The probe tip is carried by a first surface and extends from the first surface by a predetermined distance. The probe is configured to generate a signal when the tip is contacted by a second surface which is moving relative to the probe tip to provide an indication that the first and second surfaces are spaced less than the predetermined distance.

In accordance with some embodiments of the present disclosure, a capacitive measurement device for indicating when two objects moving relative to each other are spaced less than a predetermined distance apart. The device may comprise at least one elongated multilayer probe which has a conductor forming the radial center of the probe, a conducting sheath forming the radially outermost layer of the probe, and a plurality of alternating insulating and conducting layers disposed between the conducting sheath and the conductor. Each layer may radially encase a portion of the inner adjacent layer. The conductor and the next two radially outward layers may extend beyond the conducting sheath and the other layers at one end of the probe to form a probe tip. The probe tip is configured to generate an electrical signal when the probe is contacted by an object moving relative to the tip. The probe tip is positioned to extend a predetermined distance from the surface of a first object to generate a signal which indicates when a surface of a second object moving relative to the first object is spaced less than the predetermined distance from the first object.

In accordance with some embodiments of the present disclosure, a real-time rub indicating system in a rotating machine is presented. The machine may comprise a stationary component, a rotating component, and a probe. The probe may be carried by the stationary component and extend beyond a portion of the stationary component by a predetermined distance. The probe is configured to generate an electrical signal when contacted by a portion of a rotating component, thereby indicating when the portion of the stationary component is spaced less than the predetermined distance from the portion of the rotating component.

These and many other advantages of the present subject matter will be readily apparent to one skilled in the art to which the invention pertains from a perusal of the claims, the appended drawings, and the following detailed description of preferred embodiments.

Figure 1:
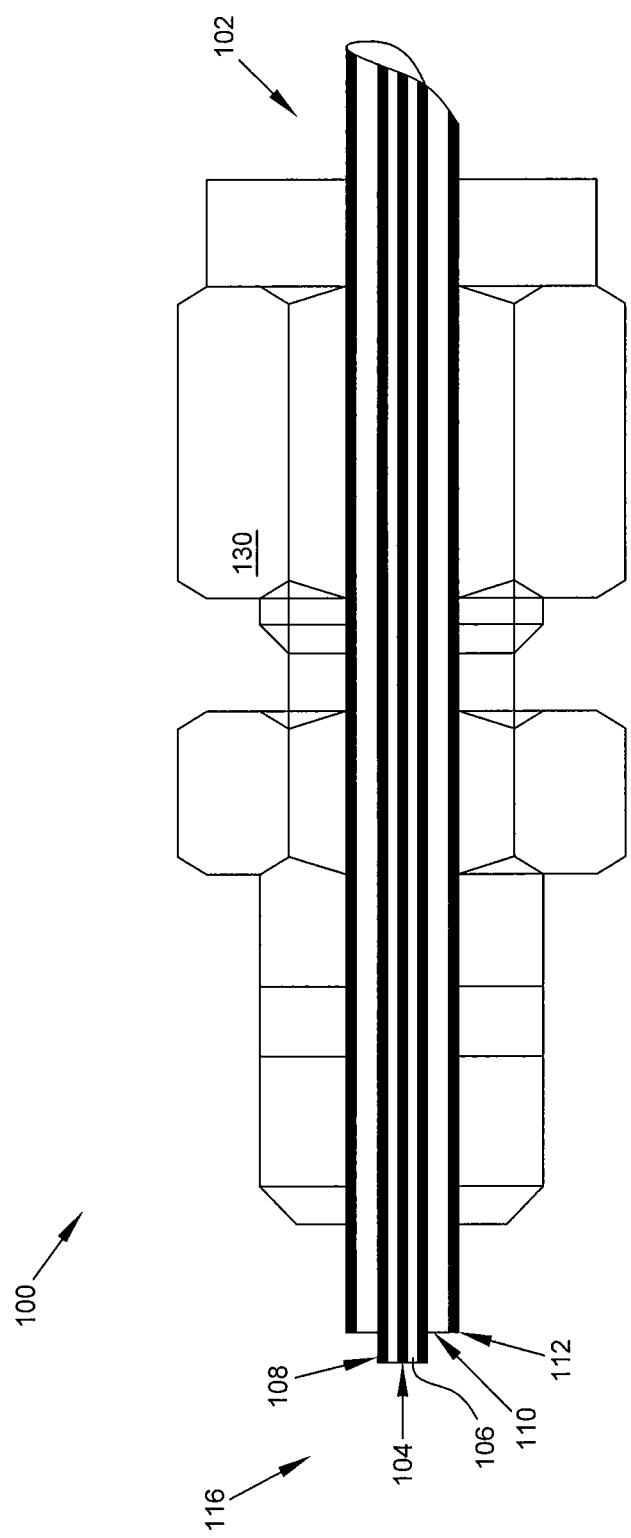
FIG. 1 is a cross-section, profile view of a capacitive measurement device in accordance with some embodiments of the present disclosure.

Referring to the drawings, some aspects of a non-limiting examples of a capacitance measurement device in accordance with some embodiments of the present disclosure are schematically depicted. In the drawings, various features, components and interrelationships therebetween of aspects of an embodiment of the present disclosure are depicted. However, the present disclosure is not limited to the particular embodiments presented and the components, features and interrelationships therebetween as are illustrated in the drawings and described herein.

DETAILED DESCRIPTION

The objectives and advantages of the claimed subject matter will become apparent from the following detailed description of preferred embodiments thereof in connection with the accompanying drawings.

In accordance with some embodiments of the present disclosure, a cross-sectional, profile view of a capacitive measurement device 100 is illustrated in FIG. 1. The measurement device 100 may comprise a probe 102 disposed within a tube adapter 130 that is configured to maintain the position of probe 102. The probe 102 may comprise an elongated conductor 104, a core insulator 106, an inner conductor (which may be referred to as a guard) 108, an insulating interlayer 110, and a conducting sheath 112. The insulating core 106 may radially encase at least a portion of the conductor 104, the conducting inner guard 108 may radially encase at least a portion of the insulating core 106, the insulating interlayer 110 may radially encase at least a portion of the conducting inner guard 108, and the conducting sheath 112 may radially encase at least a portion of the insulating interlayer 110. In some embodiments the probe 102 may further comprise a jacket (not shown) or other insulating material which may radially encase the conducting sheath 112. The probe 102 may further comprise stainless steel ferrules (not shown) disposed within the tube adapter 130 for engaging the probe 102.

A portion of the conductor 104, core 106 and inner conductor 108 may form a probe tip 116, which may extend beyond a surface defined by the interlayer 110, conducting sheath 112, jacket (if present), or a combination of these components. In some embodiments, the probe tip extends beyond this surface by a predetermined offset, which may be less than 0.1 inches. In some embodiments, the predetermined offset may be 0.05 inches. The predetermined offset may be other values, and may be adjustable for a particular embodiment.

In some embodiments, the conductor 104 may have a diameter of approximately 0.01 inches, the inner conductor 108 may have an outer diameter of less than 0.1 inches and the sheath 112 may have an outer diameter of approximately 0.12 to 0.125 inches. In some embodiments, the outer diameter of the inner guard 108 may be approximately 0.062 inches. In some embodiments, the outer diameter of the inner conductor 108 may be 0.042 or 0.032 inches, although other outer diameters may be used.

In some embodiments, the conducting sheath 112 (or a jacket) has an outer diameter of less than 0.25 inches. In some embodiments, the outer diameter of the conducting sheath 112 (or a jacket) may be 0.125 inches.

The probe 102 may be considered a subminiature capacitance sensor because of its smaller overall diameter. In addition to the smaller size, the materials from which the probe 102 is constructed, which may include mineral insulation between conductors or an air gap, further reduces the useful range over which the probe 102 may sense a change in capacitance. In some embodiments, the useful range of probe 102 may be significantly reduced when compared to the useful range of larger sensors, those comprised of different materials, or sensors which are both larger and comprised of different materials. In some embodiments, the useful range of probe 102 may be essentially zero. The reduction in useful range allows the probe 102 to act as a capacitance sensor which is less sensitive to changes in capacitance (caused by variations in the distance between the probe 102 and a target) but will indicate a dramatic voltage change when the probe 102 contacts the target.

The components of probe 102 may comprise materials suitable for a high temperature environment. These environment may be up to 1000 degrees Fahrenheit. In some embodiments, the environment may be up to 1450, 1850, or 2000 degrees Fahrenheit. For example, the conductor 104 may comprise platinum with 20 wt % rhodium. The inner conductor 108 and sheath 212 may also comprise this same material. In some embodiments, only a portion of the components of probe 102 may comprise a material suitable for a high temperature environment. For instance, the first few inches of the inner conductor 108 and sheath 212 may comprise platinum with 20 wt % rhodium, with the remainder of these components comprising hastelloy X or other metal, alloys, or other compositions.

In some embodiments, the probe 102 may comprise a triax cable. The probe 102 may be mineral or air-gap insulated with metal shielding. In some embodiments, other types of cables or wires may be used such as, e.g., a thermocouple wire or a coaxial cable.

In some embodiments, the tube adapter may be a ⅛ inch tube to 1/16 npt male adapter.

In some embodiments, the device 100 may comprise at least one probe 102.

While probe 102 is described above as having 5 layers, the probe 102 is not so limited. The probe may be a capacitive measurement device comprising a conductor comprising the radial center of the probe, a conducting sheath forming the radially outer most layer, an a plurality of alternating insulating and conducting layers disposed between the conduct and the conducting sheath. Each layer radially encases at least a portion of the inner adjacent layer. The conductor and at least the next two radially outward layer may extend beyond the conducting sheath and other alternating layers. In some embodiments the conducting sheath may be radially encased by a jacket or other outer insulator.

Figure 2:
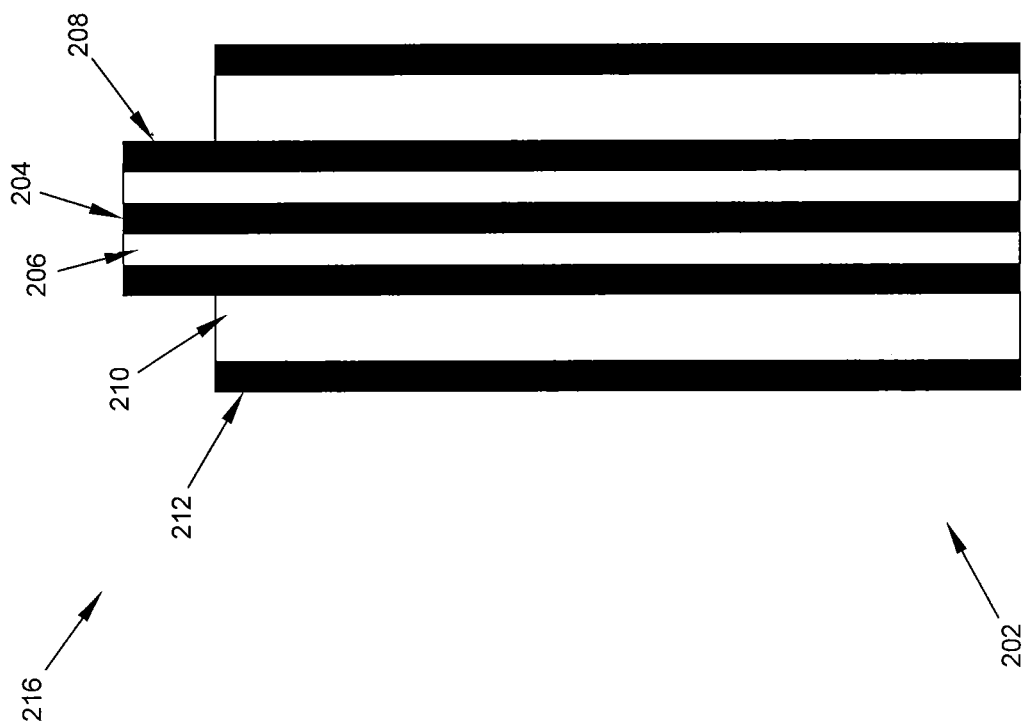
FIG. 2 is a close-up of the tip of a capacitive measurement device in accordance with some embodiments of the present disclosure.

In accordance with some embodiments of the present disclosure, a probe 202 is presented in FIG. 2. FIG. 2 is a close up view of a tip 216 of a probe 202. The probe 202 may comprise a conductor 204, core insulator 206, inner conductor 208, insulating interlayer 210, and conducting sheath 212. Each of these components may be similar to the corresponding component described above. As can be seen in FIG. 2, the conductor 204, core insulator 206, and inner conductor 208 may extend a distance beyond a surface defined by the insulating interlayer 210, conducting sheath 212, jacket if present (not shown), or all these components by a predetermined offset. This offset may be adjusted for a particular application.

By forming the probe tip 216 with only a few of the components from which the probe 202 is comprised, the area which physically contacts the target is substantially reduced. In some embodiments, this area is reduced by up to 50% when compared to the surface area enclosed by the outer diameter of the conducting sheath 212 (or jacket). This smaller area reduces the likelihood of damage to the physically-contacted, target surface. Combining the reduced range of the probe and reduced likelihood of damage to the target, probe 102 may be effective as a rub-pin which may provide a real-time indication of a contact between the probe 102 and a target surface. Additionally, the embodiment of FIG. 2 provides a highly sensitive device which can detect a change in clearance of 0.0005 inches. In some embodiments, the predetermined distance by which the probe 102 extends from a surface may be 0.0005 inches.

Figure 3:
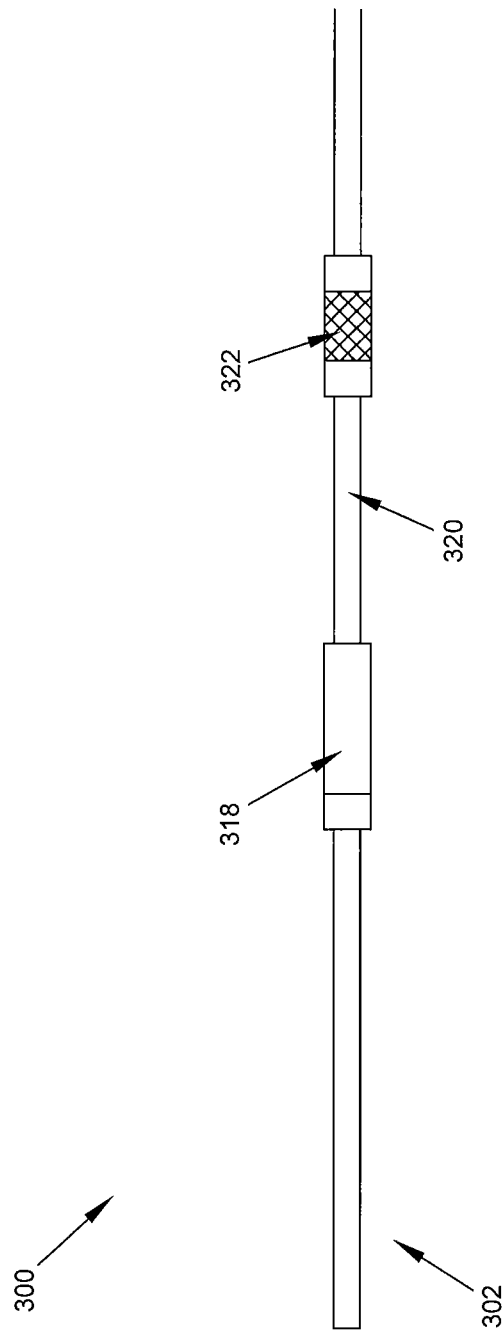
FIG. 3 is a profile view of a capacitive measurement device in accordance with some embodiments of the present disclosure.

In accordance with some embodiments of the present disclosure, a profile view of a capacitive measurement device 300 is provided in FIG. 3. The device 300 may comprise a probe 302, a transition piece 318, a flexible lead 320, and a LEMO connector 322. The LEMO connector 322 may be a triax or other connector and is used to operably connect the flexible lead 320 to signal processing equipment (not shown). The flexible lead 320 is operably connected to the probe 302 by the transition piece 318. The probe 302 may be similar to the probes 102 and 202 described above.

The probe 102, 202 and 302 may be part of a circuit which is tuned as a clearance measuring instrument. The tuning of the instrument is dependent components used for the probe, signaling equipment, and the environment in which the instrument will be used. This may require a particular length for the probe. In some embodiments the probe may be 25 inches or less. In some embodiments, the probe may be 18 inches. In some embodiments the probe may be 10 or 15 inches in length.

In operation, the probe 302 or probe tip (not shown) is carried by a first surface (not shown) and may extend by a predetermined distance past the first surface. The probe 302 may further extend in the direction of a second surface (not shown) which is in relative motion to the first surface. During operation, the clearance between the first and second surfaces may change, and may be reduced to a point wherein the clearance is equal to or less than the predetermined distance by which the probe 302 extends past the first surface. As the clearance between the two surface is reduced, the probe 302 may physically contact the second surface. This contact will cause a detectable change in the signal from the probe, which may be a distinct change in voltage, thereby providing a real-time indication of the clearance between the two surfaces. This signal is transmitted from the probe 302, through the transition piece 318 to the flexible lead 320 and into the LEMO connector 322 before arriving at the signal processing equipment (not shown).

Due to the size and materials from which the probe is constructed, the instrument will measure only a very small change in capacitance as the relative distance between the probe and a target changes. When the target contacts the sensor, the capacitance drops to essentially zero which produces a distinct voltage signal.

The signal processing equipment may be operably connected to the probe 302 and probe tip to create a capacitor between the center conductor (not shown) and the target surface (not shown). The target is grounded and will form a surface of the capacitive sensor. As the distance between the target and the center conductor changes, the capacitance of the sensor will undergo slight changes which can be measured. When the target contacts the center conductor, a distinct change in voltages is created which is indicative of contact. An oscillator may be operably connected to the inner conductor to inhibit noise in the capacitive sensor. Further, the outer conductor is configured as an overall shield for the capacitance measurement device.

While the each surface may be in motion relative to the other, one of these surfaces may be stationary relative to a third surface. For example, the first surface may be a stationary component of a rotating machine. The second surface may be a rotating component of this machine. This third surface may be another surface within the machine or a reference surface external to the machine. In some embodiments, the two surfaces may both be in motion relative to this third surface.

The machine may be any machine which has components which move relative to one another. For example, the machine may be a turbine, a compressor, a fan, an internal combustion engine, or other machine. The stationary surface may a stationary component in this machine, such as, e.g., an engine casing. The rotating component may be a blade, crankshaft, pump, or other rotating part.

Figure 4:
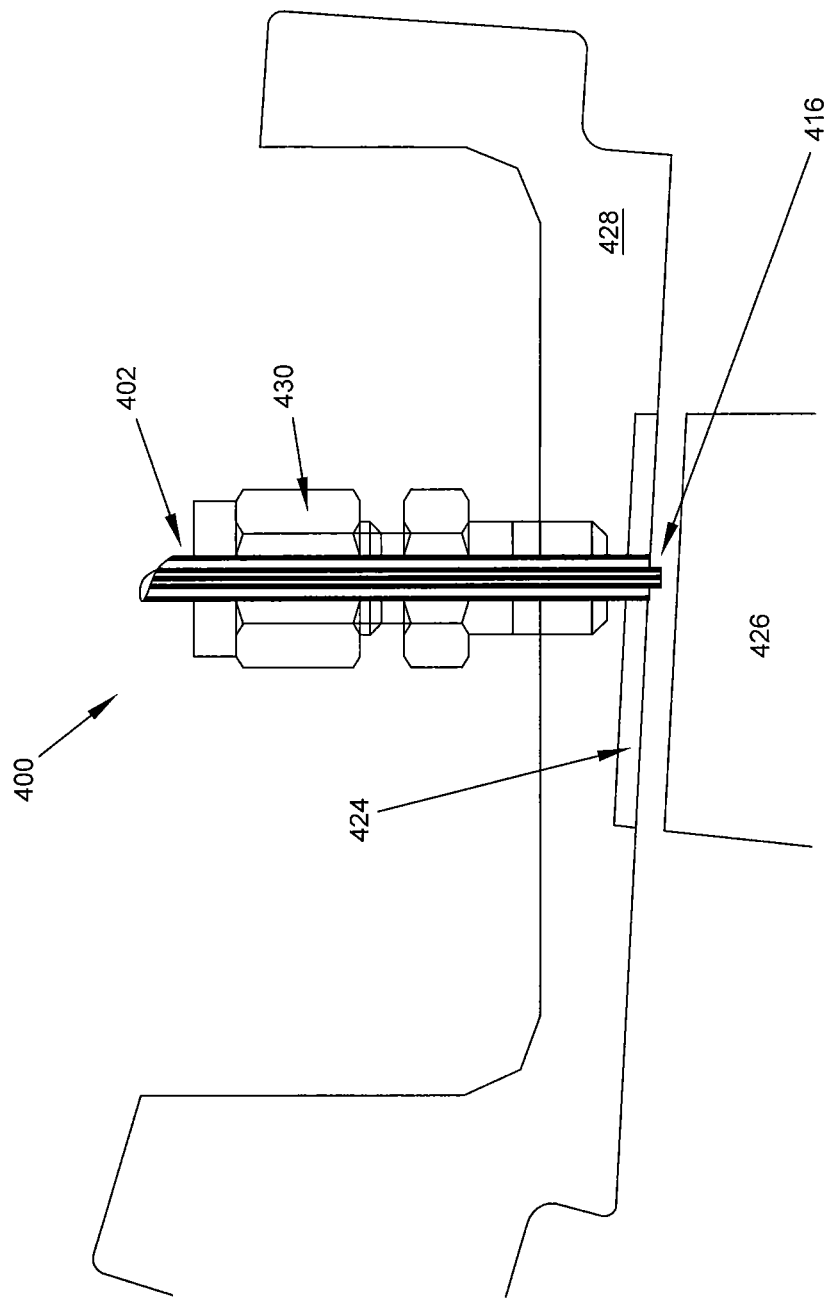
FIG. 4 is a cross-section view of a turbine capacitive measurement device in accordance with some embodiments the present disclosure.

In accordance with some embodiments of the present disclosure, a cross section of a capacitive measurement device 400 is provided in FIG. 4. The device 400 may comprise a probe 402 and tube adapter 430 in addition to a transition piece (not shown), flexible lead (not shown), connector (not shown) such as, e.g., an LEMO connector, and signal processing equipment (not shown). The probe 402 may be surrounded by an abradable liner 424 which is carried by a blade track liner 428 in a turbine, compressor, or fan. The probe 402 may be carried by the blade track liner 428. The blade track liner 428, abradable liner 424, or both may form the first surface from which the probe 402 extends. The probe 402 or probe tip 416 may extend from this first surface by a predetermined amount toward a blade 426 having a tip that forms a second surface. During operation of the turbine, thermal expansion and mechanical forces will cause the blade 426 to expand toward the abradable liner 424, thereby reducing the clearance between the two. The probe 402 may extend a distance beyond the liner 424 such that the blade 426 tip surface will contact the probe 402 and generate a signal as described above. This signal provides an indication that a predetermined clearance between the liner 424 and the blade 426 has been reached.

In some embodiments, more than one probe 402 may be used in the device 400. A second probe may be set such that it extends from the liner 424 surface a distance which is different from the predetermined distance by which the first probe extends, thereby allowing a successive indications of a decreasing clearance between the blade 426 and the liner 424.

While preferred embodiments of the present disclosure have been described, it is to be understood that the embodiments described are illustrative only and that the scope of the disclosure is to be defined solely by the appended claims when accorded a full range of equivalence, many variations and modifications naturally occurring to those of skill in the art from a perusal hereof.

I claim:

1. A capacitive measurement device for indicating when two objects moving relative to each other are spaced less than a predetermined distance, said device comprising:
at least one elongated multilayer probe having a conductor forming the radial center thereof, a conducting sheath forming the radially outermost layer, and a plurality of alternating insulating and conducting layers disposed therebetween with each layer radially encasing the inner adjacent layer, said conductor and the next two radially outward layers encasing said conductor forming a probe tip at one end, said probe tip extending axially beyond said conducting sheath and any of said plurality of alternating insulating and conducting layers that are not included in the next two radially outward layers encasing said conductor, wherein each of said conductor and the next two radially outward layers encasing said conductor form a continuous surface from a radially innermost portion of said probe tip to an outer diameter of said prove tip, said probe tip being configured to generate an electrical signal when contacted by an object moving relative thereto,
wherein said probe tip is positioned to extend a predetermined distance from the surface of a first object to thereby generate the signal to indicate when a surface of a second object moving relative to the first object is spaced less than the predetermined distance from the first object.

2. The device of claim 1, wherein said first object is a stationary component of a machine and said second object is a moving component of said machine.

3. The device of claim 1, wherein said conductor and the next two radially outward layers encasing said conductor extend beyond said conducting sheath and any of said plurality of alternating insulating and conducting layers that are not included in the next two radially outward layers encasing said conductor by a predetermined offset.

4. The device of claim 1, wherein at least a portion of said probe is configured to operate at up to at least 1000 degrees Fahrenheit.

5. The device of claim 4, wherein said probe is configured to operate at up to at least 1450 degrees Fahrenheit.

6. The device of claim 1 wherein said plurality of alternating insulating and conducting layers comprises:
   an insulating core radially encasing at least a portion of said conductor;
   a conducting inner guard radially encasing at least a portion of said insulating core; and
   an insulating interlayer radially encasing at least a portion of said conducting inner guard.

7. The device of claim 6 wherein said conducting inner guard has an outer diameter of less than 0.1 inches.

8. The device of claim 7 wherein said conducting inner guard has an outer diameter of 0.062 inches or less.

9. The device of claim 1 wherein said probe tip is configured to indicate that the first object and second object are spaced less than the predetermined distance in response to the surface of the second object contacting the probe tip.

10. The device of claim 1 wherein said second object is a stationary component of a machine and said first object is a moving component of said machine.

11. The device of claim 1 wherein said first object and said second object are moving components of a machine and move relative to each other.

12. The device of claim 1 wherein said first object is a stationary casing in a rotating machine and said second object is a rotating component of said machine.

13. The device of claim 12 wherein said second object is a blade tip.

14. The device of claim 1 wherein said predetermined distance is 0.0005 inches.

15. The device of claim 1 wherein the predetermined offset is 0.05 inches.

16. The device of claim 1 further comprising a second probe, said second probe extending a second predetermined distance from the surface of said first object, wherein the second predetermined distance is different from the first predetermined distance.

17. A capacitive measurement device for indicating when two objects moving relative to each other are spaced less than a predetermined distance, said device comprising:
   at least one elongated multilayer probe having a first axial end and a second axial end, said at least one probe comprising;
      a conductor forming the radial center thereof;
      a conducting sheath forming the radially outermost layer; and
      a plurality of alternating insulating and conducting layers disposed therebetween with each layer radially encasing the inner adjacent layer,
      said conductor and the next two radially outward layers encasing said conductor forming a probe tip at said second axial end, said probe tip extending axially beyond said conducting sheath and any of said plurality of alternating insulating and conducting layers that are not included in the next two radially outward layers encasing said conductor, said probe tip being configured to generate an electrical signal when contacted by an object moving relative thereto, and
   a tube adapter disposed radially outward of and supportively engaging a portion of said at least one probe at a location between said first and second axial ends,
   wherein said probe tip is positioned to extend a predetermined distance from the surface of a first object to thereby generate the signal to indicate when a surface of a second object moving relative to the first object is spaced less than the predetermined distance from the first object, and
   wherein an outer diameter of each of said conductor, conducting sheath, and plurality of alternating insulating and conducting layers at said location at which said tube adapter engages said probe is equal to a respective outer diameter of each of said conductor, conducting sheath, and plurality of alternating insulating and conducting layers at said second axial end.

* * * * *